3,371,473
MECHANISM FOR HARVESTING FRUIT
FROM VINES

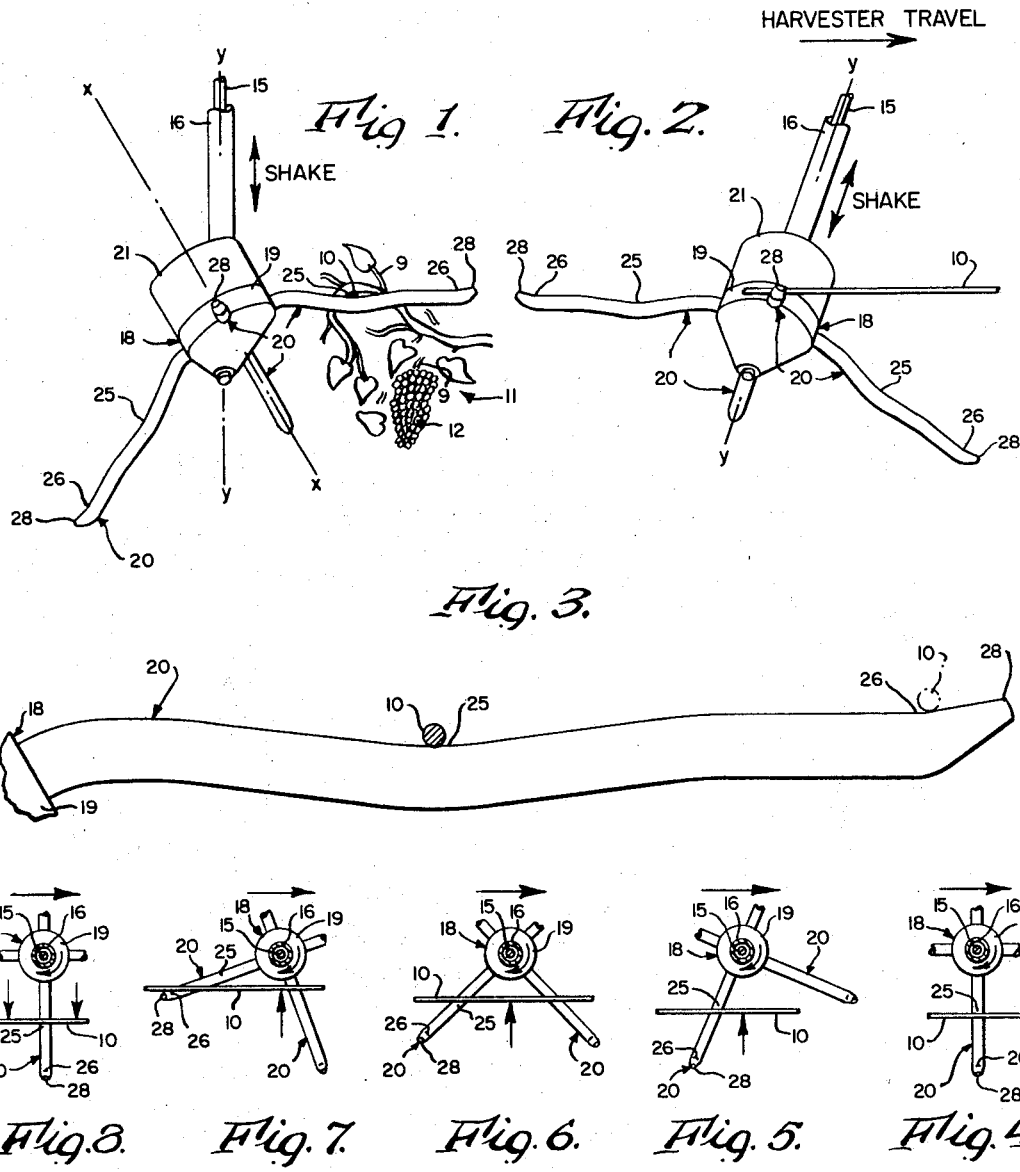

Charles G. Burton, Lewiston, N.Y., assignor to Chisholm-Ryder Company, Inc., Niagara Falls, N.Y., a corporation of New York
Continuation-in-part of application Ser. No. 449,974, Apr. 22, 1965. This application Nov. 28, 1966, Ser. No. 597,325
4 Claims. (Cl. 56—330)

ABSTRACT OF THE DISCLOSURE

In harvesting grapes a hub freely rotatable about an upright axis has been moved along the cordon wire and reciprocated or shaken generally vertically and provided with fixed radial arms which successively walk through the vines from the side and engage the underside of the wire. The present improvement is in the shape of these arms to retain engagement with the bottom of the wire for a longer time, this being accomplished by making their upper sides of longitudinally undulating form. By cordon wire is meant the generally horizontal wire supported by and generally parallel with the grape posts to which the cordons or trunks of the vines extend and along which the canes are trained.

---

This application is a continutaion-in-part of my application for Grape Harvester, Ser. No. 449,974, filed Apr. 22, 1965.

---

The invention resides in the radial arms of such a freely rotatable hub having their upper sides of longitudinally undulating form to provide at least one longitudinally extending top recess tending to hold onto the cordon wire as the wire travels toward and beyond to the free ends of said arms due to the rotation of the hub and tending to draw the cordon wire toward the axis of free rotation of the hub. Accordingly, the vertical shaking effect of each arm against the underside of the cordon wire is increased in time and effect to provide a pronounced improvement in the efficiency in the shaking mechanism.

In the accompanying drawings:

FIG. 1 is an elevational view of such freely rotatable hub and its vertically shaken supporting means and showing the relation of its axis of rotation to the line of shake as viewed from the rear of the harvester.

FIG. 2 is a view similar to FIG. 1 showing the line of shake as viewed from the right hand side of the harvester.

FIG. 3 is an enlarged side elevational view of one of the radial arms and showing a part of the freely rotatable hub on which it is mounted.

FIGS. 4-8 are fragmentary horizontal sections, looking downwardly through the vertically shaking shaft on which the freely rotatable hub is mounted, and illustrating the manner in which the arms in walking through the vines engage and hold onto the underside of the cordon wire and draw it toward the axis of the freely rotatable hub.

A very detailed description of the grape harvester in which the present invention is to be used is set forth in my said copending application Ser. No. 449,974 and the present description will be principally confined to the improvements in the vertically reciprocated shaking mechanism also described in detail in this application and to the improvements therein which constitute the present invention.

In general, for efficient use of the grape harvester, canes 9 of the grape vines of each row are trained along a horizontal cordon wire 10 so that these canes form a pendant curtain 11 which bears the fruit 12. The cordon wire is so mounted on grape posts (not shown) that it is capable of being reciprocated up and down, the shaking mechanism of the present invention engaging the underside of the cordon wire for this purpose and serving to shake the fruit 12 from the curtain 11 of canes 9 hanging therefrom.

As described in greater detail in my said copending application, the mobile harvester carries a pendant supporting rod 15 which is fixed to the mobile harvester frame and projects downwardly alongside the grape cordon wire 10 and which slidingly supports a surrounding tube 16. The upper end of this fixed supporting rod 15 is reciprocated longitudinally along the line of shake designated by the double headed arrow in FIGS. 1 and 2 and this fixed supporting rod projects downwardly in a vertical plane parallel with the cordon wire 10 but at an angle to the vertical along this plane. This angularity is downwardly and rearwardly with reference to the direction of travel of the harvester (illustrated by the overhead arrows in FIGS. 2 and 4–8) and is set at an included angle of about 20° with reference to the vertical.

At its lower end the longitudinally reciprocable tube 16 carries a freely rotatable rotor 18 journalled thereon. This rotor comprises a hub 19 and radially extending rod-like bars or arms 20 fixed to and projecting radially from the hub 19, in spaced relation to one another. The hub 19 also preferably has a skirt or cylindrical shell 21 fixed to its upper side to avoid abrasion of vines. The axis $x$—$x$ of free rotation of this hub 19 intersects the axis $y$—$y$ of the rod 15 and tube 16 and is in a plane parallel with this last axis $y$—$y$ viewed from the side of the machine (FIG. 2) but it has an acute included angle of about 30° relative to this last axis $y$—$y$ when viewed from the rear of the harvester (FIG. 1).

The radial arms 20 of the rotor 18 are at a downwardly divergent angle with reference to the free axis of rotation $x$—$x$ of the rotor 18 this being at an included angle of about 60° with reference to this axis $x$—$x$. The purpose of this angularity of these radial arms or bars 20 is to insure the arms entering the curtain 11 of canes 9 supported on the cordon wire 10 passing under but close to the wire. The freely rotatable rotor 18 is positioned so that its hub 19 travels along the side of the curtain 11 of fruit-bearing canes 9 supported by the longitudinal cordon wire 10 and so that the bars or arms 20 radiating from this hub successively enter or walk through this curtain of canes, the resistance of the curtain of canes serving to rotate the freely rotatable rotor 18 as it travels along the cordon wire 10. As each arm or bar 20 enters the side of the curtain 11 of canes 9 to be caught thereby, during the forward movement of the harvester it is brought to a position under and perpendicular to and in engagement with the underside of the cordon wire 10 as illustrated in FIG. 4. The tube 16 and hence the hub 19 and its arms 20 are at this time being shaken vertically along the supporting rod 15 and fixed to the harvester frame, the line of shake being illustrated in FIGS. 1 and 2. This shaking is preferably at a speed in the order of 200–600 c.p.m. and this shaking movement is transmitted to the fruit-bearing canes 9 supported by the wire 10 so as to shake the fruit therefrom. It will be seen that the effectiveness of each arm or bar 20 is dependent upon the length of time each arm maintains operative contact with the underside of the cordon wire 10.

To increase this length of time, the upper surface of each arm or bar 20 is made of longitudinally undulating form to provide a longitudinally extending recess 25 along the center of the bar or arm which tends to restrain the movement of the cordon wire along and off the outboard end of the bar or arm and to draw the cordon wire toward the axis of free rotation of the hub 19. Thus, each arm is provided in its upper side with the central recess 25 extending a substantial distance along the arm and having a depth greater than the thickness of the cordon wire 10 as best illustrated in FIG. 3. The cordon wire tends to stay in the bottom of this recess and hence the arm tends to draw the cordon wire radially toward the axis of free rotation of the rotor 18 as illustrated in FIGS. 5 and 6, this drawing of the cordon wire increasing the effective length of time each arm is in operative engagement with the cordon wire and making the arm correspondingly more effective in shaking grapes 12 from the curtain 11 of canes 9. In addition a recess 26 is provided along the upper surface of the outboard end of each arm or bar 20 by forming the outboard end of each arm or bar to provide upwardly and outwardly projecting horns 28 at the end of each arm or bar. When as illustrated in FIG. 7, this horn or outboard end 28 encounters the cordon wire 10, it draws the cordon still further toward the axis of free rotation of the rotor 18 thereby to still further increase the length of time of effective contact between each arm 20 and the cordon wire 10 and to increase its effectiveness in shaking loose grapes 12.

I claim:

1. A mechanism for harvesting fruit from vineyards where the vines have been trained on a generally horizontal cordon wire, the mechanism having a hub adapted to be positioned alongside said cordon wire, generally vertically reciprocable means supporting said hub for free rotation about a generally upright axis and arms fixed to said hub to project radially therefrom in spaced relation to one another and successively entering the vines below said cordon wire and engaging the underside of the cordon wire to impart the generally vertical reciprocating movement of said supporting means to the cordon wire to shake the fruit from the vines, wherein the improvement comprises the upper side of at least one of said arms being of longitudinally undulating form to provide at least one longitudinally extending top recess tending to hold onto the cordon wire as the cordon wire travels toward and beyond the free end of the arm due to the rotation of said hub and to draw said cordon wire laterally toward said axis of free rotation of said hub.

2. A harvesting mechanism as set forth in claim 1 wherein said longitudinally extending recess is along the central part of its arm and is of a depth greater than the thickness of the cordon wire.

3. A harvesting mechanism as set forth in claim 1 wherein said longitudinally extending recess is at the outboard end of said arm the tip of which is in the form of an outwardly and upwardly projecting horn to provide the recess.

4. A harvesting mechanism as set forth in claim 1 wherein all of said arms are of substantially identical undulating form to have substantially identical action in so drawing said cordon wire laterally toward the axis of free rotation of said hub.

References Cited

UNITED STATES PATENTS

| | | | |
|---|---|---|---|
| 2,893,194 | 7/1959 | Lamouria | 56—331 |
| 2,993,323 | 7/1961 | Tubbs | 56—330 |
| 3,225,894 | 12/1965 | Weygandt et al. | 56—330 X |
| 3,245,211 | 4/1966 | Weygandt et al. | 56—330 |
| 3,255,578 | 6/1966 | Pertics | 56—330 |
| 3,325,984 | 6/1967 | Christie et al. | 56—330 |

ABRAHAM G. STONE, *Primary Examiner.*

RUSSELL R. KINSEY, *Examiner.*